(No Model.)
H. ALEXANDER.
CONDUIT SUPPLY SYSTEM FOR ELECTRIC RAILWAYS.
No. 521,326. Patented June 12, 1894.
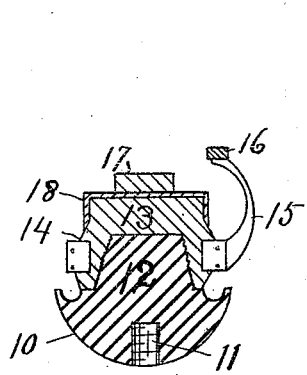
Fig. 2.
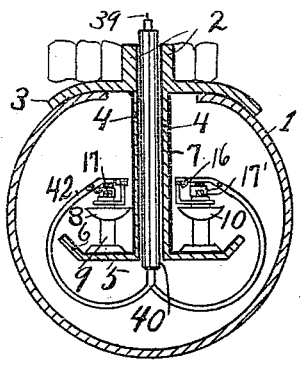
Fig. 1.
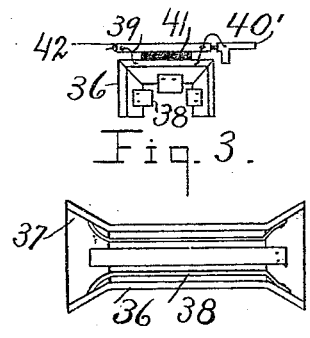
Fig. 3.
Fig. 4.
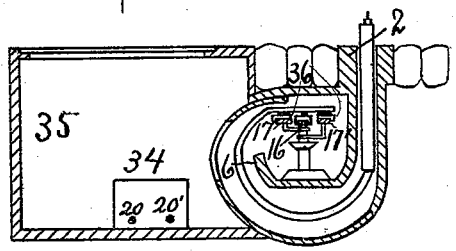
Fig. 6.
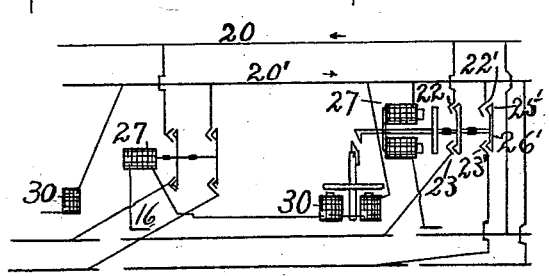
Fig. 7.
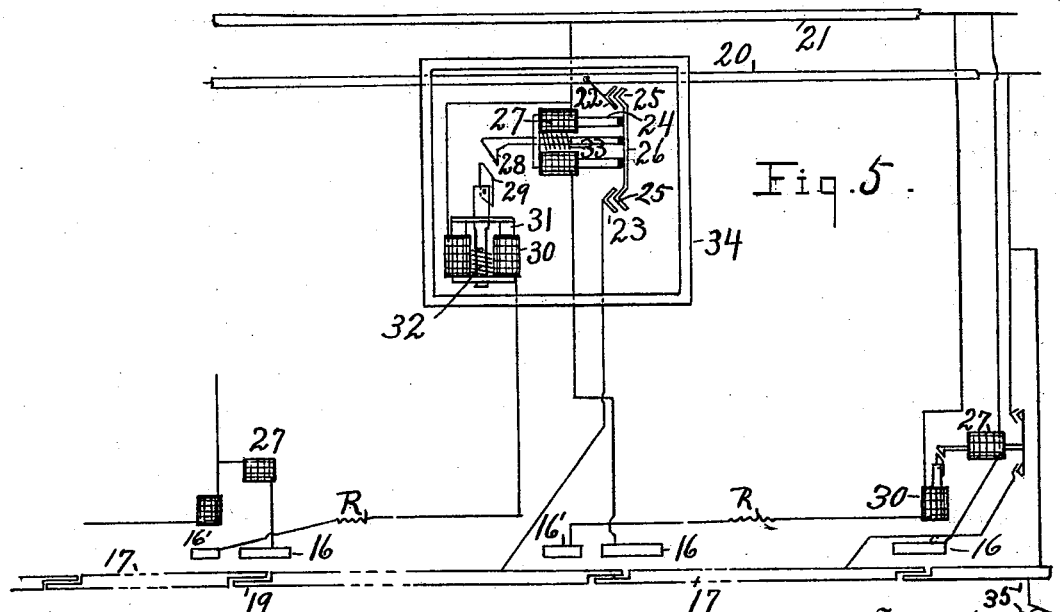
Fig. 5.
Witnesses
G. H. Stockbridge
C. L. Beleher
Inventor
H. Alexander,
By his Attorney
Charles M. Catlin.
THE NATIONAL LITHOGRAPHING COMPANY,
WASHINGTON, D. C.

UNITED STATES PATENT OFFICE.

HARRY ALEXANDER, OF NEW YORK, N. Y.

CONDUIT SUPPLY SYSTEM FOR ELECTRIC RAILWAYS.

SPECIFICATION forming part of Letters Patent No. 521,326, dated June 12, 1894.

Application filed January 9, 1894. Serial No. 496,308. (No model.)

*To all whom it may concern:*

Be it known that I, HARRY ALEXANDER, a citizen of the United States, and a resident of New York, county and State of New York, have invented certain new and useful Improvements in Electric Railways, of which the following is a specification.

The present invention relates to electric railways. The main objects of the invention are, to provide improved means for supporting, protecting and insulating conductors for railways; to provide an improved system or arrangement of conductors therefor, and an improved current collector.

In the accompanying drawings Figure 1 is a transverse sectional view of a conduit. Fig. 2 is a central vertical section of the preferred form of insulator. Fig. 3 is an end view of the preferred form of current collector, and Fig. 4 is a view thereof looking up from beneath, the supplementary collector being omitted. Fig. 5 is a view of the preferred form of switch to be described and showing also the circuit connections. Fig. 6 shows a modified conduit, and Fig. 7 shows a modified arrangement of circuits.

The conduit 1 shown in Fig. 1 is supposed to be located midway between the rails or at one side of the rails of a track. The conduit has a slot formed by the flanges 2, extending up from the plates 3 forming the top of the conduit. From these plates and preferably cast in one piece therewith, are downwardly extending plates 4, having at their lower edges rearwardly extending plates or shelves 5, terminating in the upwardly bent or curved parts 6. It will be seen that the sides 4, 5, 6, form a partially closed trough, into which no water can enter, unless the conduit is filled with water above the level of the sides 6 and since drain pipes will be used at frequent intervals, as usual, this is unlikely to happen. The inside of each trough is coated with paint or compound, such as insullac, 7, and within the troughs are supported insulators, 8, on metal or other standards 9. The insulators are preferably constructed as indicated in Fig. 2.

10 is the body of the insulator having a screw threaded socket, 11, for reception of the end of standard 9, and a screw threaded extension 12, onto which may be screwed the insulating cap 13. This cap is formed with a circumferential groove 14, in which may be clamped a bracket 15, supporting at its upper end a short contact conductor 16. On the top of cap 13 is supported a working conductor 17, preferably secured to the insulator by metal cap 18, as shown. When the working conductor 17 is continuous, as is sometimes the case, the bracket 15 and the conductor 16 may be omitted, but these parts are used in connection with a sectional working conductor, as hereinafter described.

Referring to Fig. 5, a system like that indicated in connection with Fig. 1, except that one working conductor 17, instead of two as in Fig. 1 is shown; this conductor is in sections, with flush overlapping ends 19. The length of these sections of the working conductor will depend on the character of the road, the amount of traffic, &c.

20 is a continuous supply conductor or cable, extending to a suitable power station.

21 indicates one of the rails of the track, which may serve as a return conductor.

22, 23 are switch contacts, connected respectively to the continuous supply conductor, and to a section of the sectional conductor. The parts 22, 23, are uninsulated, but other parts of the circuit are insulated to prevent leakage.

24 is an armature carrying contact devices 25, connected by a conductor 26, and adapted when drawn forward, to connect the devices 22, 23.

27 is a magnet adapted to operate said armature to close the circuit, and at the same time to carry the hook 28 toward the left, causing it to pass by the pivoted latch 29, and to be held thereby from reverse movement.

30 is a second magnet having an armature 31, which carries the pivoted latch 29. 32 is a spring having sufficient force to return the latch to, and keep it in the position shown, when the circuit of the magnet 30 is broken, after having been closed to attract the armature, and 33 is a spring adapted to return the hook 28 to the position shown, when it is released by latch 29. When a switch is in condition to connect the continuous supply conductor with a section of the working conductor the spring 33 remains slightly compressed during the entire time that the connection is maintained, but the weakening of the spring, which will result in time, will not be of much importance, since the work which the spring has to do is small. On the other hand, the spring 32, is only maintained under compression for an instant at each operation, and will retain its elasticity for a long time. Since the circuit between the continuous conductor and the working conductor is held closed by a mechanical lock, rather than by magnetic attraction, it is not necessary that the spring or device for returning the armature should be so nicely proportioned to the strength of the magnet, as would be necessary if the armature were held magnetically, hence adjusting devices can be omitted.

Adjacent to the overlapping ends of the working conductor sections, are contact conductors 16, 16'. The former are connected to magnet 27, and thence to rail 21 at the switch adjacent to said overlapping ends. The other contact conductor, 16', is connected to the magnet 30 at the switch adjacent to the opposite end of the sectional conductor, as indicated in Fig. 5. It will be understood that a switch such as described, or one adapted to perform a similar service, is provided for each break in the working conductor. The switches are preferably placed in air and water tight cases 34 in suitable man holes 35, where they can be readily reached.

35' is a source of current connected to the continuous conductor 20, and to the first section of the working conductor.

The preferred form of current collector consists of a channel shaped conducting body 36, open on its lower side, and flaring at each end, as indicated at 37, so as to be capable of readily moving from section to section of the working conductor, and to avoid catching on accidentally projecting points, to allow easy movement on curves, and to steady the collector on said conductor, the three sides of the channel are provided with springs 38. When desired one or more of these springs may be omitted. The metal collector may be carried by an insulating body 41 to which the tubular arm 42 carrying the collector is connected so as to insulate the collector from the arm.

The operation of the system has already been indicated, but will be briefly described as follows: A car being located on the first section of the road, that is at the right in Fig. 5, will receive current directly from the first section of the working conductor, through the collector 36, resting on said conductor, and through the insulated conductors 39, which pass up to the car through the arm 40 depending therefrom in the well known manner. An electric motor on the car propels the latter. When the car reaches the end of the first section of the working conductor, the supplementary contact device 40', which is electrically connected with the collector 36, makes contact with the supplementary contact conductor 16, thereby diverting current from the working conductor through the switch magnet 27 to the rail 21, operating the switch and connecting the supply conductor to the second section of the working conductor. When the car reaches the second contact conductor 16, the second switch is operated connecting the continuous supply conductor to the third section of the working conductor, and when the car reaches the contact conductor 16', current is diverted through the magnet 30 of the first switch, thereby breaking the connection between the supply conductor and the working conductor at said switch, and so on throughout the length of the line.

It will be seen that the work done by the magnets is very small, and that it is not done by the working current, but by momentary, separate or branch currents from a suitable source of current. By placing the operating magnets of the switches in separate circuits, or branches, as described, the magnets can be wound in a more efficient manner, than when placed directly in the working circuit, and the circuits through the switches and releasing magnets can be opened as soon as the armatures are moved, thus avoiding waste of current, heating of magnets, &c.

R are idle resistances.

By supporting the insulators in the manner described that is, on the coated surface of the supporting trough, practically no leakage can take place, since if an insulator becomes defective, it is still separated from the conducting body of the trough and from the earth, by the insulating paint or coating of the trough. And if it should happen that this coating was imperfect at one or a few of the insulators, the leakage would still be comparatively small.

In practice I prefer to make up the conductor supporting troughs with the insulators therein, and the working conductors supported by the insulators, in sections at the factory, so that when installing a system the conductors can be quickly put in place, thereby avoiding the necessity of keeping the street open for a long time. The conductor supporting trough, formed as described, can readily be placed in an ordinary cable conduit, by removing the top thereof, thus converting such conduit into an electric railway conduit. By overlapping the working conductor sections and arranging the contact conductors 16, 16', as described, the motor circuit will never be interrupted, and arcing will be avoided, but conductors not overlapping may be used in some cases.

Instead of using two troughs as in Fig. 1, the conduit and trough may be made as shown in Fig. 6, where there is only one trough for supporting the conductors. Continuous conductors only, or continuous and sectional conductors may be employed with this form of conduit. Two sectional working conductors, 17, 17' are shown, there being contact conductors 16, 16' adjacent to the ends of the conductor sections for closing the circuits of the switch and releasing magnets as already described. The two conductors 17, 17' are supported on separate brackets insulated from each other. The contact conductors may be supported on top of the insulators.

20, 20' are the direct and return limbs of the continuous supply circuit extending through the switch box 34 in manhole 35.

Preferably the same switch controls the connection of both sectional and continuous conductors. This only requires in addition to the parts already described, two additional contacts, 22', 23', and an additional connecting device 25', 26', insulated from the device which serves to connect 22, 23. This construction is indicated in Fig. 7. The vertical side of the conductor trough serves to guide and steady the arm depending from the car through the slot, and so also does the parallel side of the conduit in the form of Fig. 6.

The switches in boxes within the manholes can be readily reached, and so can the contact conductors, 16, 16' which preferably are located adjacent to the manholes, and the switches and contact conductors are the parts of the system most likely to need attention.

Instead of providing separate branches for for the switch and releasing magnets, said magnets may be in series in a simple branch, connected to a single contact conductor 16 (16' being omitted) as shown in Fig. 7.

While it is intended to make up the working conductors in sections equal in length to the sections of the trough, several such sections will be permanently connected together when placed in the conduit, so that the electric switches for connecting the continuous and working conductors will only be used at such intervals as needed.

I claim—

1. The combination with a slotted electric railway conduit, of a conductor supporting trough, having a side extending down from the conduit slot, and having a bottom and upturned side, and a working conductor supported in said trough, substantially as described.

2. The combination with a slotted electric railway conduit, of a conductor supporting trough, having a side extending down from the conduit slot, and having a bottom and upturned side, and a working conductor supported by insulators mounted in said trough, substantially as described.

3. The combination of a slotted railway conduit, a conductor supporting trough, the inside of which is coated with a film or coating, insulators supported on the same, and a working conductor carried by the insulators, substantially as described.

4. The combination of a slotted conduit, a plate extending down from the slot into the conduit, and a working conductor supported by means carried at the bottom of said plate.

5. The combination of a supply conductor, a sectional working conductor, normally open branches between the supply and working conductors, and switches with operating magnets and detent magnets in branches distinct from the first mentioned branches.

6. The combination of a supply conductor, a sectional working conductor, normally open branches between the supply and working conductors, switches each having a magnet 27, a circuit closing device for one of said branches, a detent magnet and armature, the magnet 27 and the detent magnet being in branches distinct from the first mentioned branch.

7. The combination of a slot iron, a conductor supporting trough connected thereto, as described, one or more conductors with exposed contact surfaces supported on said trough but insulated therefrom, and of a length equal to the length of the trough, whereby the troughs and conductor sections can be made up as complete articles and placed end to end in a conduit.

8. The combination in a switch of a magnet 27, its armature adapted to close a circuit, a hook or detent device 28, a pivoted latch 29 to engage the same, and a magnet, 30, to the armature of which said latch is connected for disengaging said parts, substantially as described.

9. The combination of a conduit, a single conductor trough therein, and supported by a plate extending down from the conduit slot, and two conductors supported by said trough, substantially as described.

10. A current collector of channel form with flaring ends and interior contact springs, substantially as described.

11. A current collector of channel form with flaring ends, and interior contact springs arranged to make contact with several sides of a working conductor.

12. An insulator consisting of an insulating body and means for supporting the conductor on the upper end thereof, and a bracket supported by the same insulator and adapted to support a supplementary conductor in fixed relation to the first mentioned conductor, substantially as described.

13. The combination in an insulator of a body 10, an insulating cap 13 thereon, and having a groove 14 therein, and a bracket 15, supported in said groove, substantially as described.

In testimony that I claim the foregoing as my invention I have signed my name, in presence of two witnesses, this 5th day of January, 1894.

HARRY ALEXANDER.

Witnesses:
ADOLPH ALEXANDER,
C. L. BELCHER.